July 16, 1929.  H. H. ALDRICH  1,721,427
CONTAINER
Filed Nov. 22, 1926

INVENTOR:
H. H. Aldrich,
by A. R. Vencill
His Attorney

Patented July 16, 1929.

1,721,427

UNITED STATES PATENT OFFICE.

HERBERT H. ALDRICH, OF WILKINSBURG, PENNSYLVANIA, ASSIGNOR, BY MESNE ASSIGNMENTS, TO WUBCO BATTERY CORPORATION, OF NIAGARA FALLS, NEW YORK, A CORPORATION OF NEW YORK.

CONTAINER.

Application filed November 22, 1926. Serial No. 149,842.

My invention relates to containers and particularly to containers for shipping fragile articles.

One object of my invention is to provide a container which will be suitable for shipping storage batteries of the glass jar type, completely assembled ready for use.

It has been considered impossible because of breakage to ship assembled batteries of the glass jar type to foreign countries; hence battery manufactures usually ship batteries of this type in knocked-down or disassembled condition. This necessitates that the assembling, filling and charging of the batteries be done after the batteries reach their destination. My invention makes it possible to ship the batteries assembled so that when they reach their destination they need only be filled with electrolyte and are then ready for use.

I will describe one form of container embodying my invention, and then point out the novel features thereof in claims.

Figure 2:
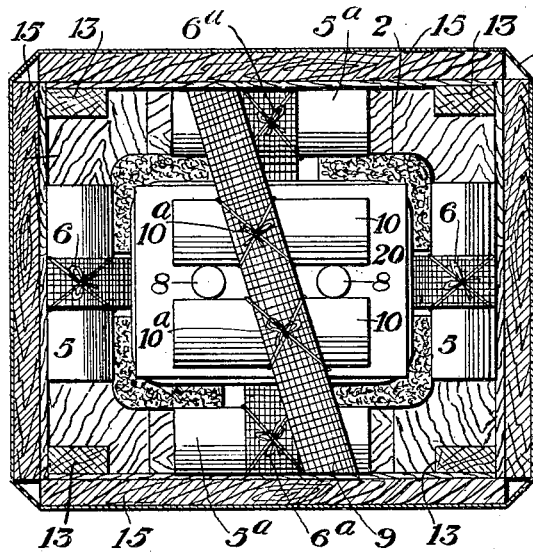
Figure 4:
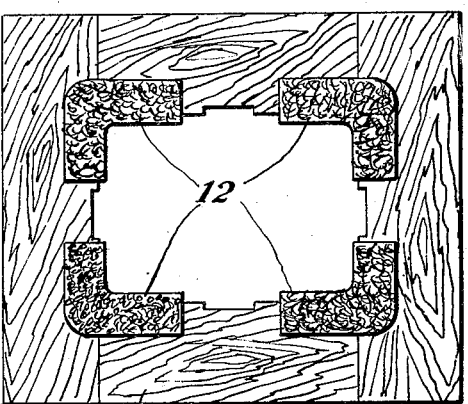
Figures 1, 3:
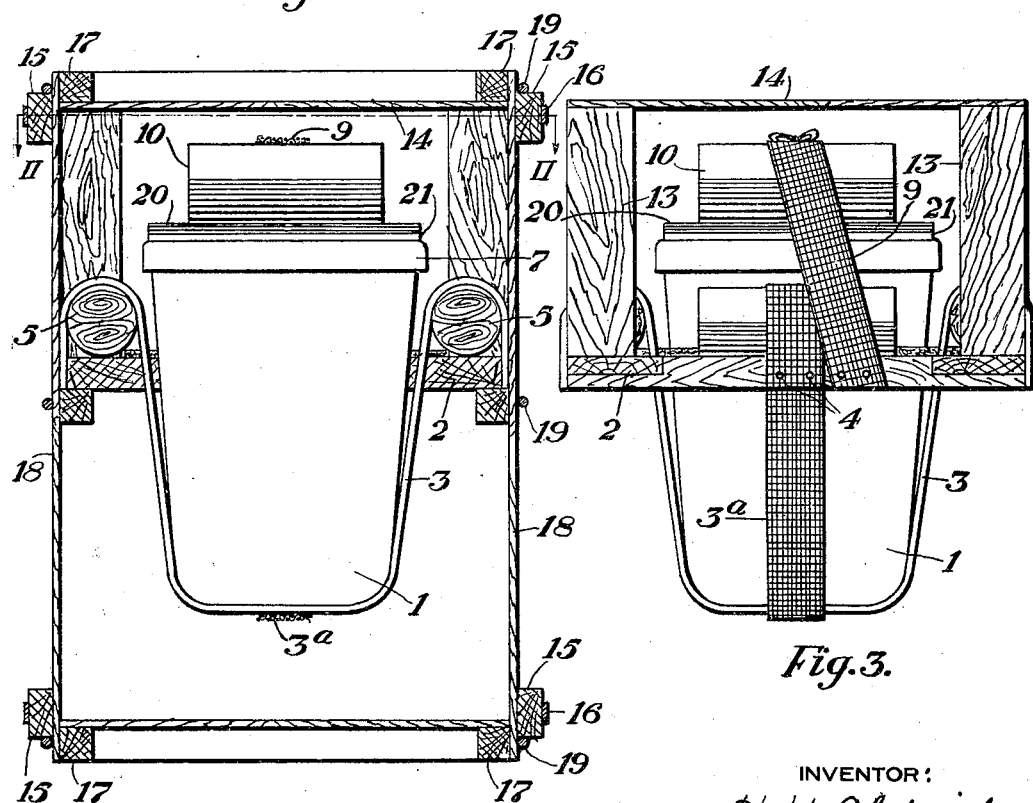

In the accompanying drawing Fig. 1 is a sectional view of one form of container embodying my invention and showing a packed battery in elevation. Fig. 2 is sectional view taken substantially on the line II—II of Fig. 1. Fig. 3 is a view in elevation showing the battery mounted in its supporting collar with the casing of the container removed. Fig. 4 is a detail view of the supporting collar used in my container.

Similar reference characters refer to similar parts in each of the several views.

Referring first to Fig. 1, the reference character 1 designates the glass jar of a battery having a top 7. The battery is mounted in a sling composed of two flexible strips 3 and 3ª of webbing which are secured to a rectangular supporting collar 2. The collar 2 is shown in detail in Fig. 4 and is composed of a plurality of strips of wood veneer fastened together to form a hollow rectangle, the inside corners of which are covered with pads 12 of felt or other suitable cushioning material. Between the top surface of the collar 2 and the ends of the flexible strip 3 are placed resilient pads 5 which may be composed of rolled excelsior covered over with strips of gummed paper. These pads act as cushions for absorbing the shocks which are given to the outside of the container and for preventing such shocks from injuring the jar 1. The strip 3ª crosses the strip 3 and has secured underneath its ends, resilient pads 5ª which are similar to the pads 5 just described. These two transverse strips of webbing support the jar and prevent it from falling downward through the collar 2. A third strip of webbing 9 is also secured to the collar and passes over the top of the battery to prevent the battery from being raised out of the collar. The top 7 of the battery may be protected by several layers 20 of thin veneer having suitable openings through which the battery terminal posts 8 project, a layer 21 of corrugated paste-board or other suitable material being placed between the bottom layer 20 and the top 7. Between the strip 9 and the top layer 20 are two other resilient pads 10 similar to the pads 5 and 5ª described above. The pads 10 are placed on opposite sides of the battery posts 8 and are secured to the strip 9 at points 10ª in any suitable manner, as by tying, for the purpose of holding the pads in position. The pads 5 and 5ª are also secured at points 6 and 6ª to the strips with which they are associated. It will now be seen that the pads 5 and 5ª on the sides of the jar 1 absorb any shocks which are produced by dropping the container in an upright position, while the two pads 10 at the top of the battery prevent shocks from being transmitted to the battery if the container is dropped upside down.

In order to prevent shocks from being transmitted to the jar from the sides of the container the supporting collar 2 is carried in a light flexible wire-bound box which is arranged to absorb shocks from the side, heavy cleats 17 and 15 being placed around the outside of the box at the top and bottom so that the side walls of the container do not strike if the container falls on its side. The supporting collar 2 is secured to one end 14 of the container by means of wooden posts 13, these posts furnishing the sole supporting means for the collar. The side walls 18 of the container are thin and flexible, and are re-enforced by suitable bands of wire 19. For the purpose of further strengthening the ends of the container, metal bands 16 may be secured around cleats 15 so as to encircle the entire container.

It will now be seen that I have provided a container in which the jar 1 is so supported that it may oscillate up and down slightly due to the resiliency of pads 5 and 5ᵃ and may also swing side-wise to a slight extent when the outside of the container is deformed by shocks. The supporting collar 2 being suspended in a very flexible outside shell, it is remarkably free from the shocks which are transmitted to the outside surface of the container and hence, batteries which are shipped in this container will not be injured by the ordinary handling which such containers receive.

Although I have herein shown and described only one form of container embodying my invention, it is understood that various changes and modifications may be made therein within the scope of the appended claims without departing from the spirit and scope of my invention.

Having thus described my invention, what I claim is:

1. In a shipping container, a rigid collar, two transverse strips of fabric having their ends secured to the collar, and adapted to support an article, a third strip of fabric secured to the collar and adapted to pass over the article, and a resilient pad beneath the third strip of fabric for engaging the top surface of the article.

2. In a shipping container, a rigid collar, a plurality of resilient pads secured to one surface of the collar, and strips of flexible material secured at both ends to the collar and passing over the pads for resiliently supporting an article within the collar.

3. In a shipping container, a rigid rectangular collar, a pair of flexible strips secured at both ends to the collar and crossing each other to form a bottom supporting structure, a resilient pad between each of the strips and the top surface of the collar, a third flexible strip secured at both ends to the collar and arranged to pass over the article supported within the collar, and a resilient pad secured to the third strip and arranged to engage the top surface of the article.

4. In a shipping container, a rigid supporting collar, a plurality of flexible strips secured at both ends to the collar to form a cradle-like support, a resilient pad secured between each end of each strip and the supporting collar, another strip secured at both ends to the collar to form a top support, and a resilient pad secured to the other strip for engaging the top surface of the article to be supported.

5. In a shipping container, a rigid collar, a supporting structure composed of flexible strips secured to the collar and having resilient pads between the collar and the strips for absorbing shocks, and one of the strips having a resilient pad secured thereto for engaging the article to be supported.

6. In a shipping container, a rigid supporting collar, a supporting structure composed of fabric strips secured to the collar and arranged to engage the projecting ends of an article within the collar, and cushioning means associated with each strip for rendering the support resilient.

In testimony whereof I affix my signature.

HERBERT H. ALDRICH.